US011226172B2

(12) United States Patent
Lamotte et al.

(10) Patent No.: US 11,226,172 B2
(45) Date of Patent: Jan. 18, 2022

(54) WEAPON TUBE AND PARTICULARLY TORPEDO TUBE STRUCTURE

(71) Applicant: NAVAL GROUP, Paris (FR)

(72) Inventors: Arnaud Lamotte, Ruelle sur Touvre (FR); Johan Raffoux, Ruelle sur Touvre (FR); Stéphane Niot, Ruelle sur Touvre (FR)

(73) Assignee: NAVAL GROUP, Paris (FR)

( * ) Notice: Subject to any disclaimer, the term of this patent is extended or adjusted under 35 U.S.C. 154(b) by 0 days.

(21) Appl. No.: 16/079,052

(22) PCT Filed: Feb. 24, 2017

(86) PCT No.: PCT/EP2017/054295
§ 371 (c)(1),
(2) Date: Aug. 22, 2018

(87) PCT Pub. No.: WO2017/144646
PCT Pub. Date: Aug. 31, 2017

(65) Prior Publication Data
US 2019/0339041 A1    Nov. 7, 2019

(30) Foreign Application Priority Data

Feb. 25, 2016    (FR) ..................... 16/00320

(51) Int. Cl.
*F41F 3/052*    (2006.01)
*F41F 3/08*    (2006.01)
*F16B 2/10*    (2006.01)

(52) U.S. Cl.
CPC ............... *F41F 3/052* (2013.01); *F41F 3/08* (2013.01); *F16B 2/10* (2013.01)

(58) Field of Classification Search
CPC ..... F41F 3/08; F41F 3/052; F41F 3/10; F16B 2/10
(Continued)

(56) References Cited

U.S. PATENT DOCUMENTS 1,402,746 A * 1/1922 Dieter ....................... F41F 3/08
114/238
2,435,444 A * 2/1948 Frieder .................... B64D 1/04
114/239
(Continued)

FOREIGN PATENT DOCUMENTS

DE    1043875 B   * 11/1958 .............. F41A 19/29
EP    2 107 331 A1    10/2009
(Continued)

OTHER PUBLICATIONS

International Search Report, dated May 8, 2017, from corresponding PCT application No. PCT/EP2017/054295.
(Continued)

*Primary Examiner* — Reginald S Tillman, Jr.
(74) *Attorney, Agent, or Firm* — Nixon & Vanderhye

(57) ABSTRACT

Disclosed is a weapon tube and particularly a torpedo tube structure including a system for holding the weapon in a storage position in the tube, including a clamping mechanism which is connected to the structure and can be moved by an actuator between a closed position for locking an interface part of the weapon in order to lock the weapon in position in the structure and an open position for releasing the interface part and therefore the weapon, the structure includes an elastic unit for soliciting the clamping mechanism in the closed position.

9 Claims, 2 Drawing Sheets

(58) Field of Classification Search
USPC .................................................. 102/202.7
See application file for complete search history.

(56) References Cited

U.S. PATENT DOCUMENTS

| | | | | |
|---|---|---|---|---|
| 2,921,802 A * | 1/1960 | Canner | ............... | F16L 37/32 |
| | | | | 285/18 |
| 3,548,708 A * | 12/1970 | Hubigh | ............... | F41A 1/08 |
| | | | | 89/1.818 |
| 3,808,941 A * | 5/1974 | Biggs | ............... | B64D 1/02 |
| | | | | 89/1.51 |
| 3,811,360 A * | 5/1974 | Ricks | ............... | F41F 3/052 |
| | | | | 89/1.807 |
| 3,825,980 A * | 7/1974 | Moore | ............... | F41F 3/052 |
| | | | | 24/603 |
| 3,987,741 A * | 10/1976 | Tryon | ............... | B63C 11/48 |
| | | | | 114/322 |
| 4,616,554 A * | 10/1986 | Spink | ............... | F41F 3/052 |
| | | | | 89/1.806 |
| 5,744,745 A * | 4/1998 | Shim | ............... | F41F 3/052 |
| | | | | 89/1.806 |
| 6,418,870 B1 * | 7/2002 | Lanowy | ............... | F41F 3/10 |
| | | | | 114/238 |
| 8,317,025 B1 * | 11/2012 | Kolozs | ............... | F42B 39/22 |
| | | | | 206/521 |
| 8,356,554 B2 * | 1/2013 | Nurminen | ............... | F41F 3/052 |
| | | | | 102/445 |
| 2010/0326309 A1 * | 12/2010 | Nurminen | ............... | F41A 9/58 |
| | | | | 102/473 |

FOREIGN PATENT DOCUMENTS

| | | | | |
|---|---|---|---|---|
| EP | 2107331 A1 | * | 10/2009 | |
| FR | 1581703 A | * | 9/1969 | ............ F41F 3/052 |
| WO | 01/92095 A1 | | 12/2001 | |

OTHER PUBLICATIONS

FR Search Report, dated Nov. 2, 2016, from corresponding FR application No. 1600320.

* cited by examiner

FIG.3

WEAPON TUBE AND PARTICULARLY TORPEDO TUBE STRUCTURE

BACKGROUND OF THE INVENTION

The present invention relates to a weapon lunching tube structure, and in particular a torpedo launcher.

Structures of this type are already well known in the state of the art, and they may traditionally include a system for holding the weapon in the storage position in the tube.

Such holding systems are used to guarantee the blocking of the weapon, and in particular the torpedo, in the tube, in particular to avoid any movement thereof in the tube during evolutions of the carrier vehicle, for example a submarine strictly speaking or a surface building.

Also as a general rule, such a holding system includes a clamping mechanism connected to the structure of the tube and movable by actuating means, between a closed position for blocking an interface part of the weapon, in order to block this weapon in position in the tube, and an open position for releasing this interface part and therefore the weapon.

The actuating means for example comprise means assuming the form of a lever able to be actuated by an operator or a cylinder, for example pneumatic, making it possible to move the clamping mechanism between its closed and open positions.

However, handling errors have been noted for example by operators, these errors resulting in a flaw in the blocking of the weapon in position or incorrect blocking thereof.

One can then see that this blocking flaw or incorrect blocking thereof may have relatively serious consequences both for the weapon and for the operators and carrier.

BRIEF SUMMARY OF THE INVENTION

The invention therefore aims to resolve these problems.

To that end, the invention relates to a weapon tube, and particularly a torpedo tube structure, including such a weapon holding system, including a clamping mechanism connected to the structure and movable by actuating means, between a closed position for blocking an interface part of the weapon in order to block the latter in position, and an open position for releasing this interface part and therefore the weapon, characterized in that it comprises elastic means for stressing the clamping mechanism in the closed position.

The structure according to the invention may include one or more of the following features, considered alone or according to any technically possible combination(s):
- the clamping mechanism includes a closing cylinder of the clamp and in that the elastic means are associated with this cylinder to push it into the closed position of the mechanism;
- the elastic means comprise a helical spring placed behind the cylinder to push the latter;
- the actuating means comprise an unlocking lever able to be manipulated by an operator;
- the closing cylinder is associated with a withdrawal chamber and is connected to the expulsion of the tube to guarantee the opening of the clamping mechanism during firing of the weapon;
- the interface part of the weapon includes a member fastened thereon and provided with a spherical portion suitable for cooperating with the clamping mechanism to block the weapon.

BRIEF DESCRIPTION OF THE SEVERAL VIEWS OF THE DRAWINGS

The invention will be better understood upon reading the following description, provided solely as an example, and done in reference to the appended drawings, in which:

FIG. 3 shows a detailed sectional view of an example embodiment of these clamping means.

DETAILED DESCRIPTION OF THE INVENTION

Figure 1:
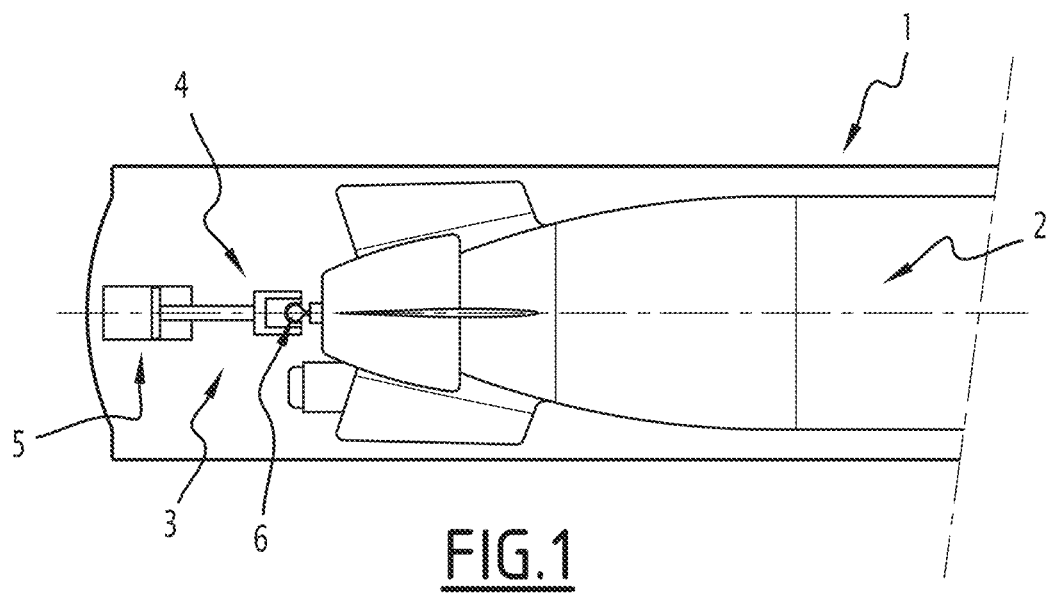
FIG. 1 shows a block diagram illustrating the installation of a weapon in a tube structure according to the invention and means for holding the weapon in position.

These figures, and in particular FIG. 1, show a weapon launching tube, and in particular a torpedo launching tube.

In FIG. 1, the tube is designated by general reference 1, and the weapon, such as the torpedo, by general reference 2.

A system for holding the weapon 2 in the storage position in the tube 1 is provided in the tube 1.

This system for holding the weapon is designated by general reference 3 in these figures.

This system includes a clamping mechanism designated by general reference 4 and connected traditionally to the rest of the tube 1.

This holding system is movable by actuating means, designated by general reference 5, between a closed position, for blocking an interface part of the weapon 2 in order to block the latter in position in the tube structure, and an open position, for releasing this interface part and therefore the weapon 2.

In general, the interface part of the weapon includes a member fastened thereon and is provided with a spherical portion suitable for cooperating with the clamping mechanism 4 to block the weapon 2.

Figure 2:
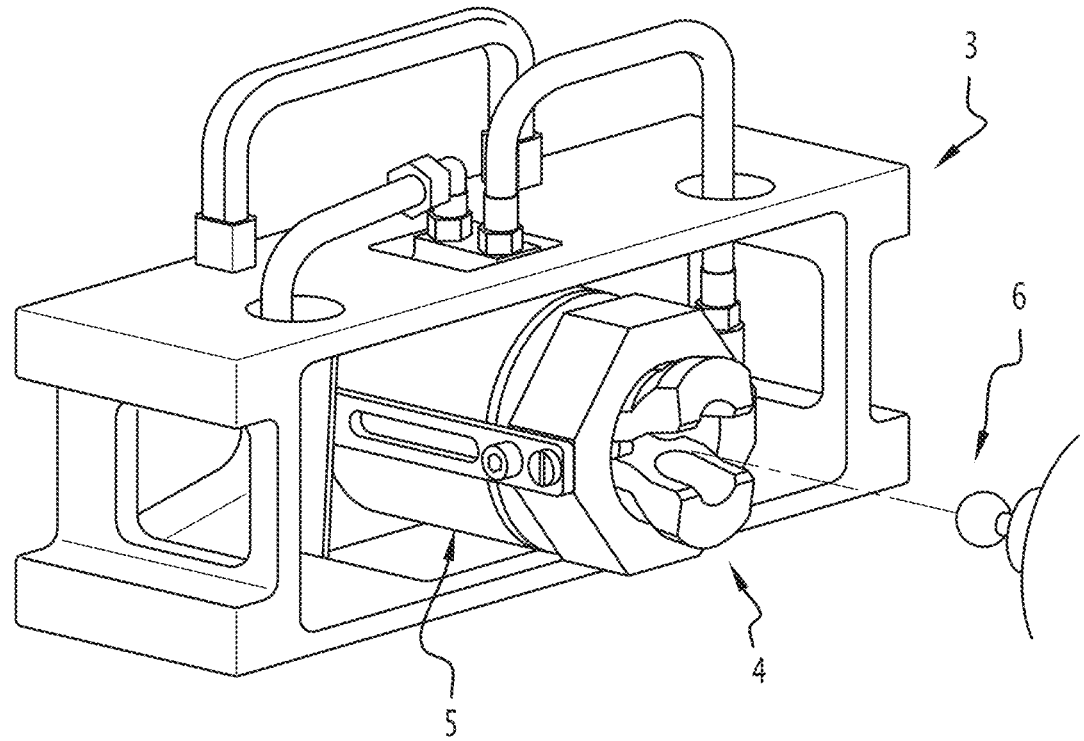
FIG. 2 shows a clamping mechanism involved in the makeup of a structure according to the invention.

This interface part is designated by general reference 6 in FIGS. 1 and 2, and is therefore connected to the rear end of the weapon 2, such as a torpedo.

FIG. 2 shows an example embodiment of this system 3 for holding the weapon in position.

FIG. 2 in fact shows the holding system, designated by general reference 3, the clamping mechanism, designated by general reference 4, and the means for actuating this clamping mechanism 4, designated by general reference 5.

This FIG. 2 also shows the interface part 6 of the weapon 2, provided with a spherical portion, suitable for cooperating with the clamping mechanism 4, to block the weapon 2 in the tube.

In FIG. 1, the clamping mechanism 4 is illustrated in the closed position around the interface part 6, to block the weapon 2 in the tube, while in FIG. 2, this clamping mechanism 4 is illustrated in the open position, for releasing the interface part 6 and therefore the weapon 2.

Figure 3:
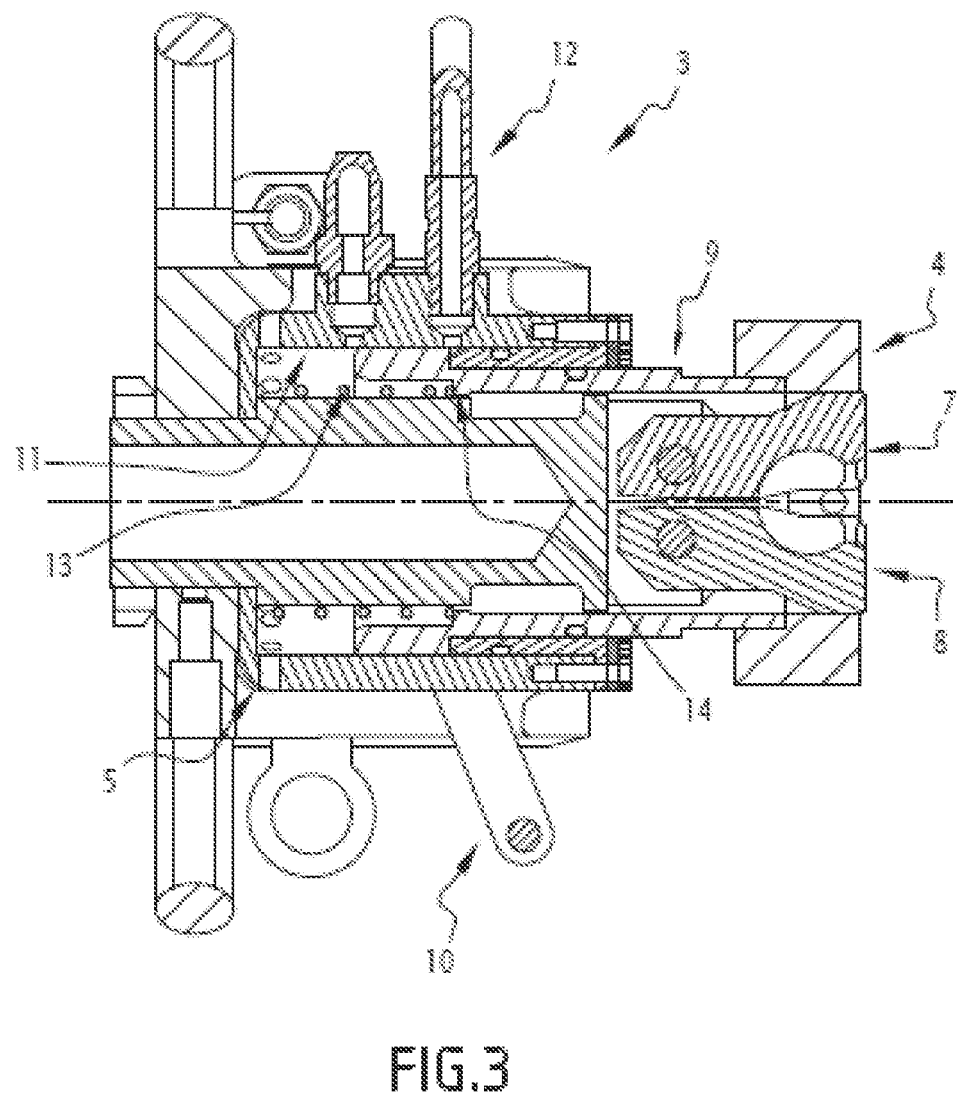

FIG. 3 provides a more detailed illustration of one example embodiment of such a holding system 3.

In this FIG. 3, the holding system is still designated by general reference 3, the clamping mechanism by general reference 4, and the means for actuating the latter by general reference 5.

Indeed and as illustrated, the clamping mechanism 4 for example includes two articulated clamping jaws designated by general references 7 and 8 in this FIG. 3, associated with a sliding cylinder for closing this clamp, designated by general reference 9 in this figure.

This closing cylinder 9 is in fact mounted to be slidable in the rest of the holding system 3, to make it possible to close or open the clamp, i.e., to block or release the interface part 6 and therefore the weapon 2.

A maneuvering lever, designated by general reference 10 in this figure, able to be actuated by an operator, is also provided to make it possible to maneuver this mechanism.

The closing cylinder 9 of the clamping mechanism 4 is also associated with the withdrawal chamber, designated by general reference 11 in this FIG. 3, and is for example connected to the expulsion circuit of the tube 1, to provide the opening of the clamping mechanism 4, during the firing or launching of the weapon 2.

Indeed, during the triggering of the expulsion, i.e., the firing of the weapon, pressurized air is injected into the holding system 3, to cause the cylinder 9 to withdraw and therefore to move the latter toward its position opening the clamping mechanism 4, in order to release the weapon 2, in order to fire it.

This is made possible via coupling means 12 of this holding system to the expulsion circuit.

The injection of pressurized air from the expulsion circuit into this system in fact makes it possible to cause this sliding cylinder 9 to withdraw and therefore to open the clamping mechanism 4 in order to release the weapon 2.

According to the invention and in order to resolve the various aforementioned problems, regarding a blocking flaw of the weapon 2 in position through an alignment problem or a maneuvering flaw of the clamping mechanism 4, in the structure according to the invention, elastic means are provided for stressing the clamping mechanism 4 in the closed position.

In the example embodiment illustrated in FIG. 3, these elastic stressing means comprise a helical spring placed behind the cylinder 9 to push the latter toward its closed position of the clamping mechanism 4.

This helical spring is for example designated by general reference 13 in this FIG. 3.

This spring 13 is placed in the withdrawal chamber 11 of the closing cylinder 9 of the clamping mechanism, in order to push this cylinder 9 forward, while bearing for example on a stop flange 14 thereof, in order to bring this cylinder 9 into the closed position of the clamping mechanism 4.

Of course, elastic means other than a helical spring can be considered.

One can then see that these elastic means make it possible to apply a continuous stress on the clamping mechanism to close it.

Placing the weapon 2 in the unblocking position then requires a positive action on the lever 10 and/or closing the expulsion circuit to inject pressurized air into the system, to open the clamp and therefore release the weapon.

Once the lever 10 is released by the operator or the pressure is released from the expulsion circuit, the spring 13 pushes the closing cylinder 9 of the clamp, into the active closing position.

It is therefore no longer possible for the clamp to remain in the open position, as was the case in the state of the art.

Of course, still other embodiments can be considered.

The invention claimed is:

1. A weapon tube comprising:
   a weapon holding system in a storage position in the tube, including a clamping mechanism connected to the weapon tube and movable by an actuator, between a closed position in which the clamping mechanism is clamped around an interface part of a weapon in order to block the weapon in position, and an open position in which the clamping mechanism releases the interface part and therefore the weapon, the clamping mechanism comprising two articulated jaws and a closing cylinder of the clamping mechanism; and
   an elastic element in contact with the clamping mechanism and configured to directly push the clamping mechanism to clamp around the interface part in the closed position, the elastic element comprising a helical spring disposed behind the closing cylinder to push the cylinder.

2. The weapon tube according to claim 1, wherein the actuator comprises an unlocking lever configured to be manipulated by an operator.

3. The weapon tube according to claim 1, wherein the closing cylinder is associated with a withdrawal chamber and is connected to an expulsion circuit of the weapon tube to guarantee the opening of the clamping mechanism during firing of the weapon.

4. The weapon tube according to claim 1, wherein the interface part of the weapon includes a member fastened thereon and provided with a spherical portion configured to cooperate with the clamping mechanism to block the weapon.

5. The weapon tube according to claim 2, wherein the interface part of the weapon includes a member fastened thereon and provided with a spherical portion configured to cooperate with the clamping mechanism to block the weapon.

6. The weapon tube according to claim 3, wherein the interface part of the weapon includes a member fastened thereon and provided with a spherical portion configured to cooperate with the clamping mechanism to block the weapon.

7. A weapon tube comprising:
   a weapon holding system in a storage position in the tube, including a clamping mechanism connected to the weapon tube and movable by an actuator, between a closed position in which the clamping mechanism is clamped around an interface part of a weapon in order to block the weapon in position, and an open position in which the clamping mechanism releases the interface part and therefore the weapon, the clamping mechanism comprising two articulated jaws and a closing cylinder of the clamping mechanism; and
   an elastic element in contact with the clamping mechanism and configured to directly push the clamping mechanism to clamp around the interface part in the closed position, the elastic element comprising a helical spring disposed behind the closing cylinder to push the cylinder,
   wherein the closing cylinder of the clamping mechanism is distinct from the articulated jaws.

8. The weapon tube according to claim 1, wherein the elastic element is in a position further from the interface part than the closing cylinder in relation to a longitudinal axis of the weapon tube.

9. The weapon tube according to claim 8, wherein the elastic element is configured to directly push the closing cylinder of the clamping mechanism to cause the articulated jaws to clamp around the interface part of the weapon.

* * * * *